United States Patent
Shetgar et al.

(10) Patent No.: US 11,738,870 B2
(45) Date of Patent: Aug. 29, 2023

(54) SHORT THROW PROJECTOR AS IN-FLIGHT ENTERTAINMENT DISPLAY

(71) Applicant: B/E AEROSPACE, INC., Winston Salem, NC (US)

(72) Inventors: Tippanna Shetgar, Hyderabad (IN); Rajesh Mohanam, Hyderabad (IN); Aravinda Mahabaleshwara, Hyderabad (IN); Sivakumar Dwaraganathan, Hyderabad (IN)

(73) Assignee: B/E AEROSPACE, INC., Winston Salem, NC (US)

(*) Notice: Subject to any disclaimer, the term of this patent is extended or adjusted under 35 U.S.C. 154(b) by 121 days.

(21) Appl. No.: 17/136,898

(22) Filed: Dec. 29, 2020

(65) Prior Publication Data
US 2021/0276715 A1 Sep. 9, 2021

(30) Foreign Application Priority Data
Mar. 5, 2020 (IN) .............................. 202041009539

(51) Int. Cl.
| | |
|---|---|
| *B64D 11/00* | (2006.01) |
| *H04N 9/31* | (2006.01) |
| *H04N 5/74* | (2006.01) |
| *G03B 21/28* | (2006.01) |
| *G03B 21/00* | (2006.01) |
| *G03B 21/30* | (2006.01) |
| *B60R 11/02* | (2006.01) |

(52) U.S. Cl.
CPC .... *B64D 11/00151* (2014.12); *B64D 11/0015* (2013.01); *G03B 21/00* (2013.01); *G03B 21/28* (2013.01); *G03B 21/30* (2013.01); *H04N 5/7475* (2013.01); *H04N 9/315* (2013.01); *H04N 9/3141* (2013.01); *H04N 9/3144* (2013.01); *H04N 9/3152* (2013.01); *B60R 11/0229* (2013.01); *B60R 11/0235* (2013.01)

(58) Field of Classification Search
CPC ......... B64D 11/0015; B64D 11/00151; H04N 9/3141; H04N 5/7475; H04N 9/315; H04N 9/3152; B60R 11/0229; B60R 11/0235; G03B 21/00; G03B 21/28; G03B 21/30
See application file for complete search history.

(56) References Cited

U.S. PATENT DOCUMENTS

| | | | | |
|---|---|---|---|---|
| 5,123,728 A | * | 6/1992 | Gradin | H04N 9/3141 353/38 |
| 6,043,854 A | * | 3/2000 | Scott | H04N 7/18 348/789 |
| 7,048,388 B2 | * | 5/2006 | Takaura | G02B 17/0848 353/77 |
| 7,946,717 B2 | * | 5/2011 | Abe | G03B 21/147 359/650 |

(Continued)

FOREIGN PATENT DOCUMENTS

| | | | |
|---|---|---|---|
| CN | 107416210 A | * 12/2017 | |
| DE | 102004013691 A1 | * 11/2005 | ........... G02B 17/026 |

*Primary Examiner* — David N Werner
(74) *Attorney, Agent, or Firm* — Snell & Wilmer L.L.P.

(57) ABSTRACT

An in-flight entertainment system is disclosed. In various embodiments, the in-flight entertainment system includes a display having a viewing surface and a back surface opposite the viewing surface; and a projector connected to the display and configured to illuminate the viewing surface.

19 Claims, 11 Drawing Sheets

(56) References Cited

U.S. PATENT DOCUMENTS

| | | | |
|---|---|---|---|
| 8,025,415 B2* | 9/2011 | Abe | G03B 21/147 |
| | | | 353/77 |
| 8,740,144 B2 | 6/2014 | Goehlich et al. | |
| 9,158,185 B2 | 10/2015 | Petrisor | |
| 2005/0046755 A1 | 3/2005 | Hattori et al. | |
| 2005/0110952 A1* | 5/2005 | Pho | B64D 11/00151 |
| | | | 353/28 |
| 2005/0243300 A1* | 11/2005 | Pate | G03B 21/30 |
| | | | 348/E5.143 |
| 2008/0024463 A1 | 1/2008 | Pryor | |
| 2012/0092628 A1* | 4/2012 | Takahashi | G03B 21/28 |
| | | | 353/82 |
| 2017/0329139 A1* | 11/2017 | Shearman | H04N 9/3141 |
| 2020/0233215 A1* | 7/2020 | Nakamura | G02B 27/0101 |

* cited by examiner

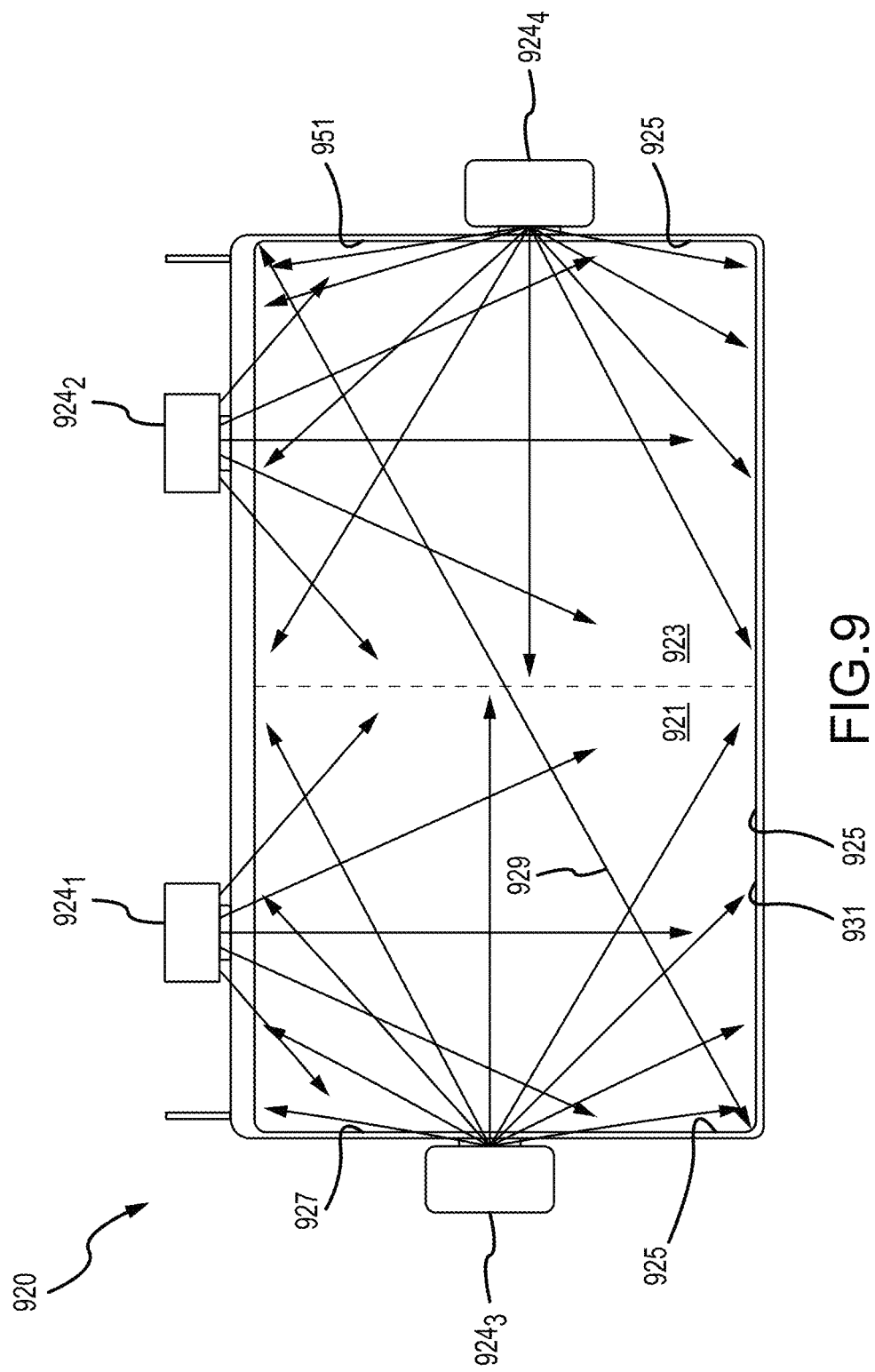

SHORT THROW PROJECTOR AS IN-FLIGHT ENTERTAINMENT DISPLAY

CROSS-REFERENCE TO RELATED APPLICATIONS

This application claims priority to, and the benefit of, India Patent Application No. 202041009539, filed Mar. 5, 2020 and titled "SHORT THROW PROJECTOR AS IN-FLIGHT ENTERTAINMENT DISPLAY," which is incorporated by reference herein in its entirety for all purposes.

FIELD

The present disclosure relates generally to display systems for vehicles and, more particularly, to display systems for in-flight entertainment monitors disposed on seatbacks within a passenger aircraft.

BACKGROUND

Aircraft passenger cabins may include rows of seats having displays or entertainment monitors disposed within the seatback or headrest portions of the seats and configured for viewing by passengers seated immediately behind the seatback or headrest portions. Such displays or entertainment monitors may include various components that lead to large and relatively thick display systems which, in turn, lead to relatively thick seatbacks or headrests because of the need to incorporate the display systems within the seatbacks or headrests. The relatively thick seatbacks or headrests, in turn, result in reduced forward space for passengers while seated. The reduced forward space, however, may increase the potential for head injuries from head strikes against the display systems in the event of hard breaking or crash events. In display systems having liquid crystal displays, head strike criteria may also be exacerbated due to breaking and scattering of the liquid crystal displays upon impact.

SUMMARY

An in-flight entertainment system is disclosed. In various embodiments, the in-flight entertainment system includes a display having a viewing surface and a back surface opposite the viewing surface; and a projector connected to the display and configured to illuminate the viewing surface via at least one mirror configured to configured to receive a light signal from a light source and to reflect the light signal onto the viewing surface.

In various embodiments, the projector is connected to the back surface and includes the light source configured to direct the light signal in a first direction substantially parallel to a portion of the back surface. In various embodiments, the projector includes a first mirror oriented to redirect the light signal from the first direction to a second direction. In various embodiments, the projector includes a second mirror oriented to redirect the light signal from the second direction onto the viewing surface. In various embodiments, an electronics package is configured to power the light source, the electronics package mounted on the back surface of the display. In various embodiments, the electronics package includes a printed circuit board and a heat sink configured to cool the light source.

In various embodiments, the projector includes a first portion connected to the back surface of the display and a second portion directed toward the viewing surface. In various embodiments, the first portion of the projector includes a first mirror oriented to redirect the light signal, incident from a first direction substantially parallel to a portion of the back surface, toward a second mirror. In various embodiments, the second mirror is disposed within the second portion of the projector and oriented to redirect the light signal toward the viewing surface. In various embodiments, an overall length of the projector in a direction parallel to a surface normal of the viewing surface is between about one inch and about four inches.

An aircraft passenger seating arrangement is disclosed. In various embodiments, the seating arrangement includes a first seat having a seatback; and an in-flight entertainment system disposed within the seatback, the in-flight entertainment system including a display having a viewing surface and a back surface opposite the viewing surface, and a projector connected to the display and configured to illuminate the viewing surface.

In various embodiments, the projector is connected to the back surface and includes a light source configured to direct a light signal in a first direction substantially parallel to a portion of the back surface. In various embodiments, the projector includes a first mirror oriented to redirect the light signal from the first direction to a second direction, the second direction being substantially parallel to a surface normal defined by the viewing surface. In various embodiments, the projector includes a second mirror oriented to redirect the light signal from the second direction onto the viewing surface.

In various embodiments, an electronics package configured to power the light source, the electronics package disposed within the seatback and mounted on the back surface of the display. In various embodiments, the electronics package includes a printed circuit board and a heat sink configured to cool the light source.

In various embodiments, the projector includes a first portion connected to the back surface of the display and a second portion directed toward the viewing surface. In various embodiments, the first portion of the projector includes the first mirror oriented to redirect the light signal and the second mirror is disposed within the second portion of the projector and oriented to redirect the light signal toward the viewing surface.

A method of illuminating a display having a viewing surface and a back surface opposite the viewing surface is disclosed. In various embodiments, the method includes directing a light signal in a first direction substantially parallel to the back surface toward a first mirror; redirecting the light signal in a second direction toward a second mirror; and redirecting the light signal received by the second mirror toward the viewing surface. In various embodiments, the light signal is generated by a light source connected to the back surface of the display and oriented to direct the light signal in the first direction.

The forgoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The accompanying drawings illustrate various embodiments employing the principles described herein and are a part of the specification. The illustrated embodiments are meant for description and not to limit the scope of the claims.

FIG. 9 illustrates a frontal view of an in-flight entertainment system, in accordance with various embodiments;

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
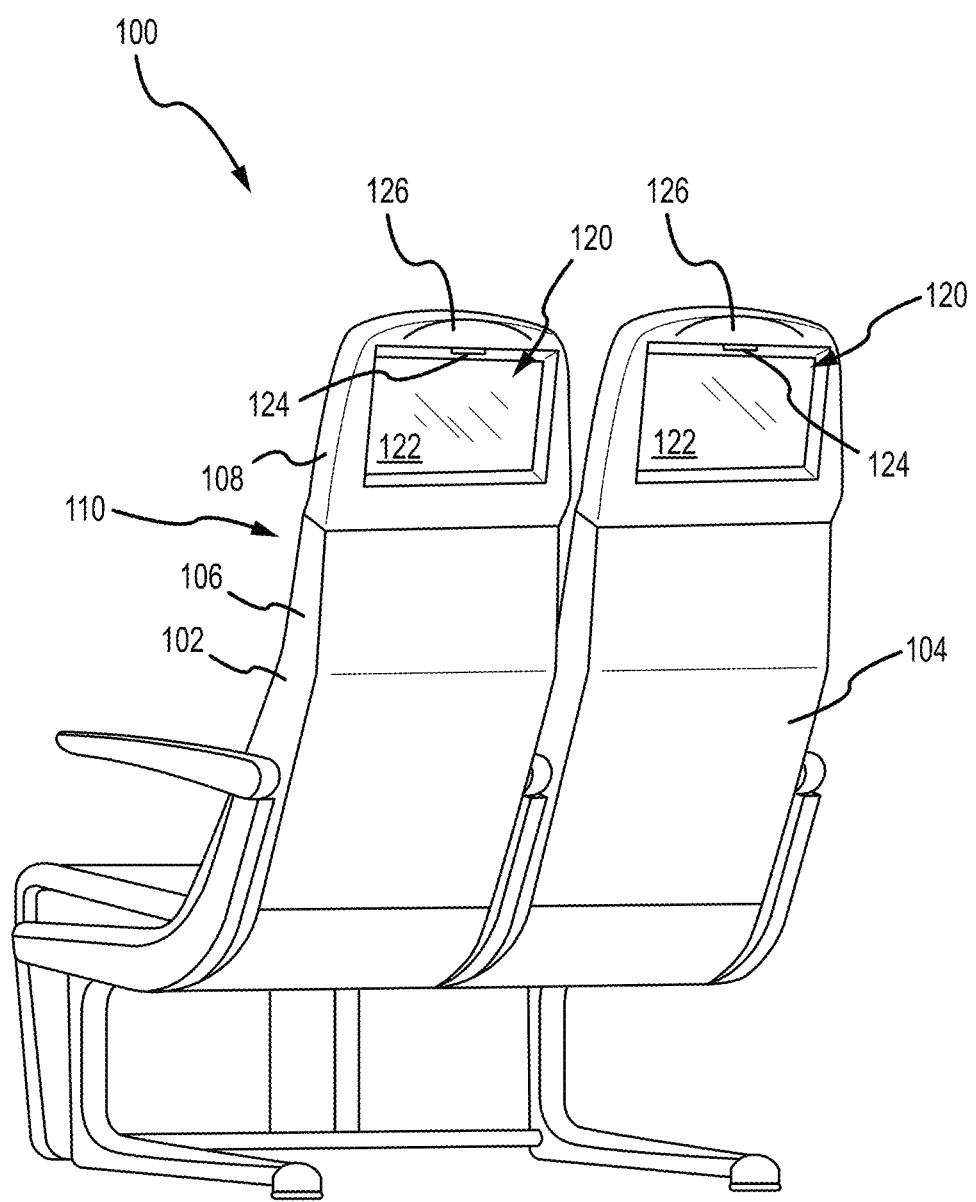
FIG. 1 illustrates a perspective view of an aircraft passenger seating arrangement having in-flight entertainment systems disposed within the seatback or headrest portions of the arrangement, in accordance with various embodiments.

Referring to FIG. 1, an aircraft passenger seating arrangement 100 having in-flight entertainment systems disposed within the seatback or headrest portions of the arrangement is illustrated. a passenger seating arrangement in accordance with various embodiments, an aircraft 10 is illustrated. Specifically, the aircraft passenger seating arrangement 100 includes a first seat 102 and a second seat 104 disposed adjacent the first seat 102. Both the first seat 102 and the second seat 104 include a seatback portion 106 and a headrest portion 108. Without loss of generality, the seatback portion 106 and the headrest portion 108 may be subsumed within a seatback 110. Both the first seat 102 and the second seat 104 include an in-flight entertainment system 120 disposed within the seatback 110 corresponding to each seat. In various embodiments, the in-flight entertainment system 120 includes a display 122 and a projector 124, both of which may be disposed within a housing 126.

Figure 2A:
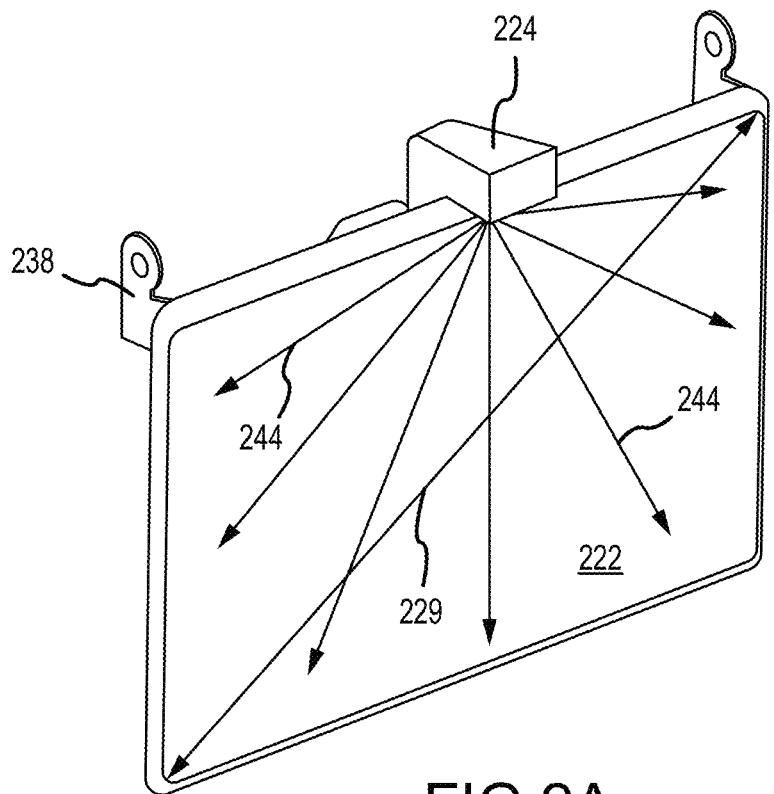
FIGS. 2A, 2B, 2C and 2D illustrate various views of an in-flight entertainment system, in accordance with various embodiments.
Figure 2B:
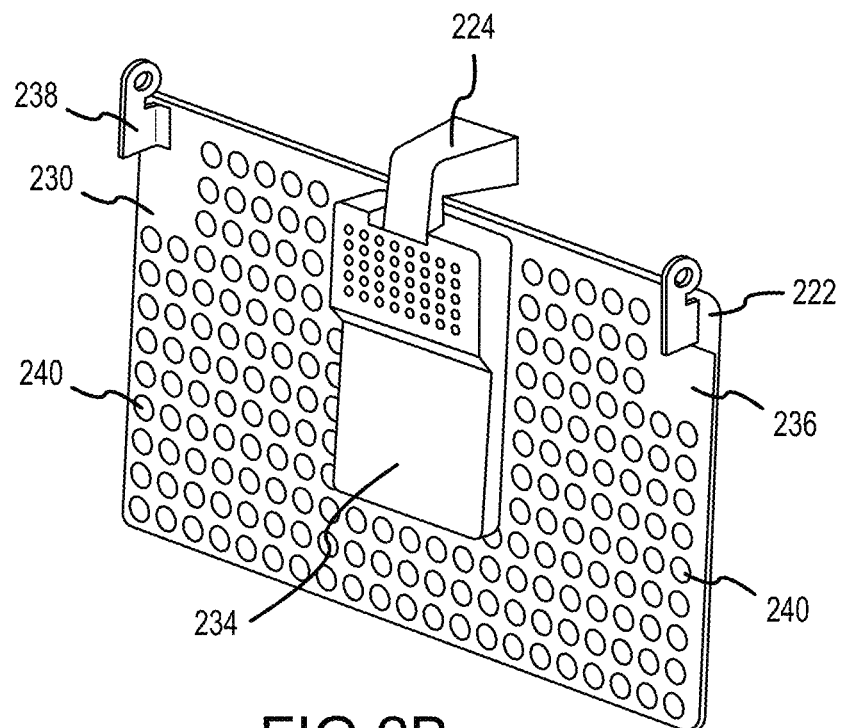
Figure 2D:
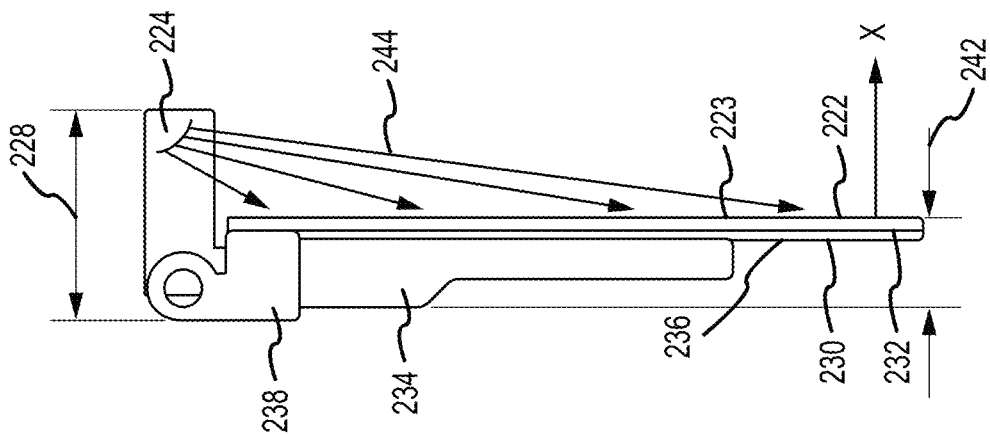
Figure 2C:
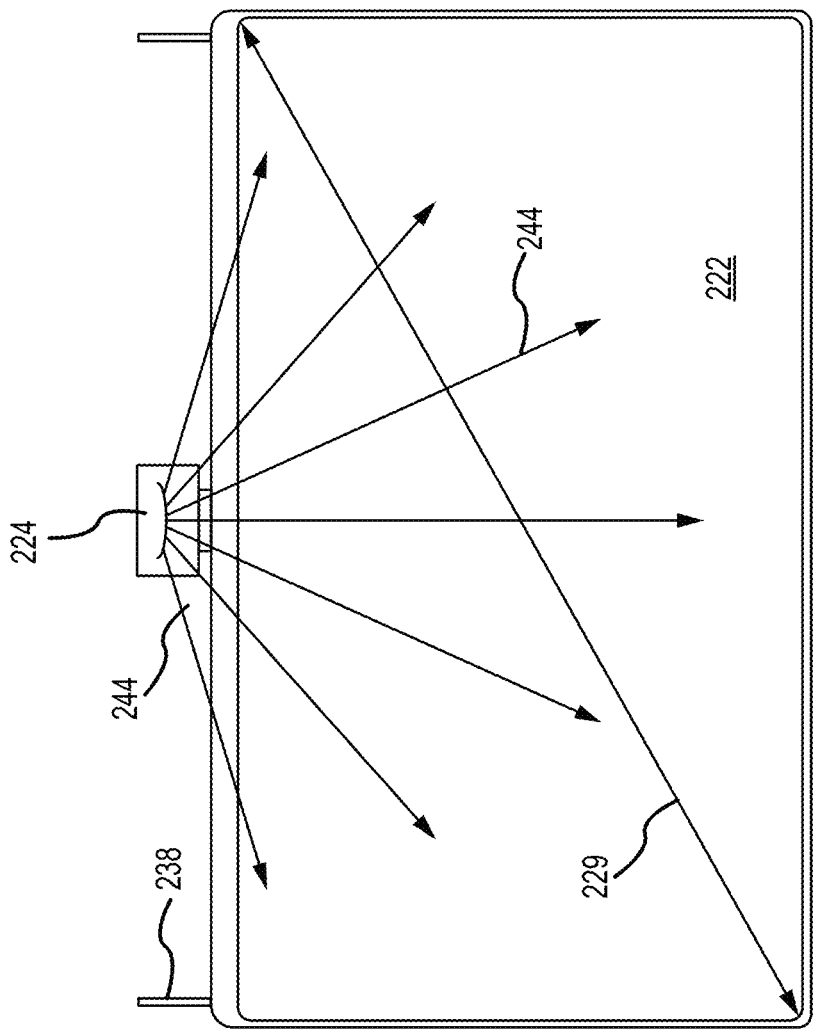

Referring now to FIGS. 2A, 2B, 2C and 2D, various schematic views of an in-flight entertainment system 220, similar to the in-flight entertainment system 120 described above with reference to FIG. 1, are provided. The various schematic views include a frontal perspective view (FIG. 2A), a rearward perspective view (FIG. 2B), a frontal view (FIG. 2C) and a side view (FIG. 2D). As illustrated in the various schematic views, the in-flight entertainment system 220 includes a display 222 and a projector 224. As described in further detail below, in various embodiments, the projector 224 is an ultra-short throw projector that enables the in-flight entertainment system 220 to have an overall thickness 228 (or an overall length in an axial or x-direction parallel to a surface normal of a viewing side 223 of the display) on the order of about one inch ($\approx$25.4 mm) for a display diagonal 229 on the order of thirteen inches ($\approx$330 mm). In various embodiments, an overall length of the projector in a direction parallel to a surface normal of the viewing surface is between about one inch ($\approx$25.4 mm) and about four inches ($\approx$100 mm). In various embodiments, the in-flight entertainment system 220 further includes a support structure 230, to which the display 222 is mounted on a first side 232 (or an aft-facing side) and to which an electronics package 234 is mounted on a second side 236 (or a forward facing side). The support structure 230 may be constructed of a light-weight metal (e.g., aluminum) or plastic material, include one or more mounting tabs 238 for mounting the in-flight entertainment system 220 to a seatback, and include a plurality of apertures 240 extending therethrough for added weight reduction. In various embodiments, the electronics package 234 may be sized such that an inner thickness 242 of the in-flight entertainment system 220 (e.g., the thickness not including the projector 224) is one the order of one-half inch ($\approx$12.7 mm) for a display diagonal 229 on the order of thirteen inches ($\approx$330 mm). As described in further detail below, the ultra-short throw characteristics of the in-flight entertainment system 220 are configured to project light rays 244 onto the display to form a continuous image, enabling a passenger to view movies, play games or to receive messages from the cockpit of flight crew.

Figure 3B:
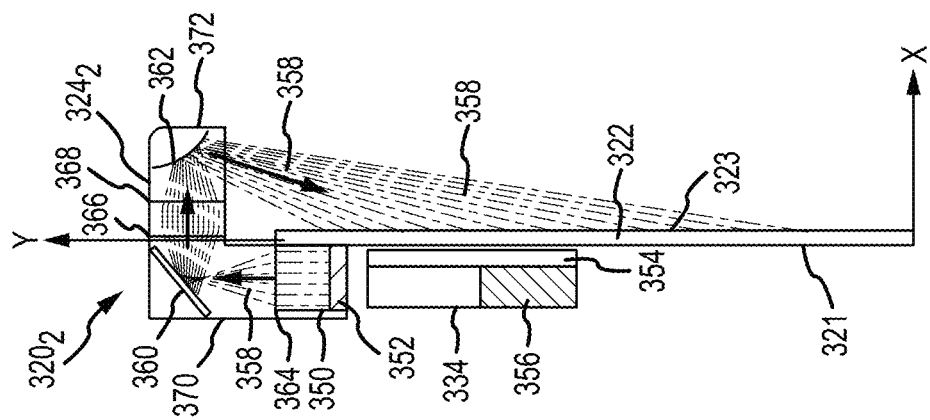
FIGS. 3A and 3B illustrate various side views and operational characteristics of an in-flight entertainment system, in accordance with various embodiments.
Figure 3A:
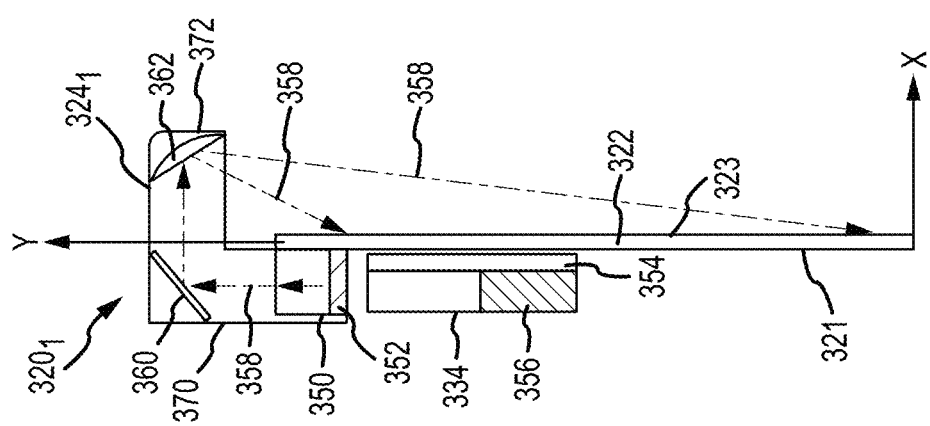

Referring now to FIGS. 3A and 3B, schematic side views of various embodiments of an in-flight entertainment system, similar to the in-flight entertainment system 220 described above with reference to FIGS. 2A-2D, are provided. Specific to FIG. 3A, in various embodiments, a first in-flight entertainment system $320_1$ includes a display 322 and a first projector $324_1$. The first projector $324_1$ includes an optical engine 350 electrically coupled to an electronics package 334. In various embodiments, the optical engine 350 comprises an optical module containing a light source, such as, for example, a plurality of red, green and blue light emitting diodes 352 (or RGB LEDs) or a laser. The electronics package 334 may include circuitry on a printed circuit board 354 that is thermally protected by a heat sink 356, which, in various embodiments, may be either a passive heat sink or a fan-driven heat sink. A light signal 358 from the light source—e.g., the plurality of red, green and blue light emitting diodes 352—is directed upward in a generally vertical direction (e.g., a first direction or the positive y-direction), which is parallel to a back surface 321 of the display 322 that is also aligned with the y-direction, with the screen of the display 322 having a surface normal that generally faces an axial direction (e.g., the x-direction). The light signal 358 interacts with a first mirror 360 configured to redirect the light signal 358 in a second direction generally aligned with the positive x-direction. The light signal 358 then interacts with a second mirror 362 configured to redirect the light signal 358 in a generally negative y-direction and onto the display 322. In various embodiments, the second mirror 362 is contoured or shaped to spread the light signal 358 over a viewing surface 323 of the display 322. In various embodiments, the first mirror 360 is disposed within a first portion 370 of the first projector 324$_1$, while the second mirror 362 is disposed within a second portion of the first projector 324$_1$. The first mirror within the first portion 370 is positioned adjacent the back side of the display 322 (i.e., on the side where the x-direction is negative) and oriented to receive the light signal 358 from the first direction and redirect it along the second direction toward the second mirror 363. The second mirror 362 within the second portion 372 is positioned adjacent the viewing side of the display 322 (i.e., on the side where the x-direction is positive) and oriented to receive the light signal 358 from the second direction and redirect it onto the viewing side of the display 322.

Specific now to FIG. 3B, in various embodiments, a second in-flight entertainment system 320$_2$ includes a display 322 and a second projector 324$_2$. The second projector 324$_2$ includes an optical engine 350 electrically coupled to an electronics package 334. In various embodiments, the optical engine 350 comprises an optical module containing a plurality of red, green and blue light emitting diodes 352 (or RGB LEDs). The electronics package 334 may include circuitry on a printed circuit board 354 that is thermally protected by a heat sink 356, which, in various embodiments, may be either a passive heat sink or a fan-driven heat sink. A light signal 358 from the plurality of red, green and blue light emitting diodes 352 is directed upward in a generally vertical direction (e.g., a first direction or the positive y-direction), which is parallel to the display 322 that is also aligned with the y-direction, with the screen of the display 322 having a surface normal that generally faces an axial direction (e.g., the x-direction). The light signal 358 interacts with a first mirror 360 configured to redirect the light signal 358 in a second direction generally aligned with the positive x-direction. In various embodiments, prior to interacting with the first mirror 360, the light signal 358 is directed through a first lens 364, which, in various embodiments, may be a converging lens, though the disclosure contemplates any lens system suitable for illuminating the display 322. Following being reflected by the first mirror 360, the light beam may be directed through one or both of a second lens 366 and a third lens 368, one or both of which may be a converging lens. The light signal 358 then interacts with a second mirror 362 configured to redirect the light signal 358 in a generally negative y-direction and onto the display 322. In various embodiments, the second mirror 362 is contoured or shaped to spread the light signal 358 over a viewing surface 323 of the display 322. In various embodiments, the first mirror 360 is disposed within a first portion 370 of the second projector 324$_2$, while the second mirror 362 is disposed within a second portion of the second projector 324$_2$. The first mirror within the first portion 370 is positioned adjacent the back side of the display 322 (i.e., on the side where the x-direction is negative) and oriented to receive the light signal 358 from the first direction and redirect it along the second direction toward the second mirror 363. The second mirror 362 within the second portion 372 is positioned adjacent the viewing side of the display 322 (i.e., on the side where the x-direction is positive) and oriented to receive the light signal 358 from the second direction and redirect it onto the viewing side of the display 322.

Figure 4:
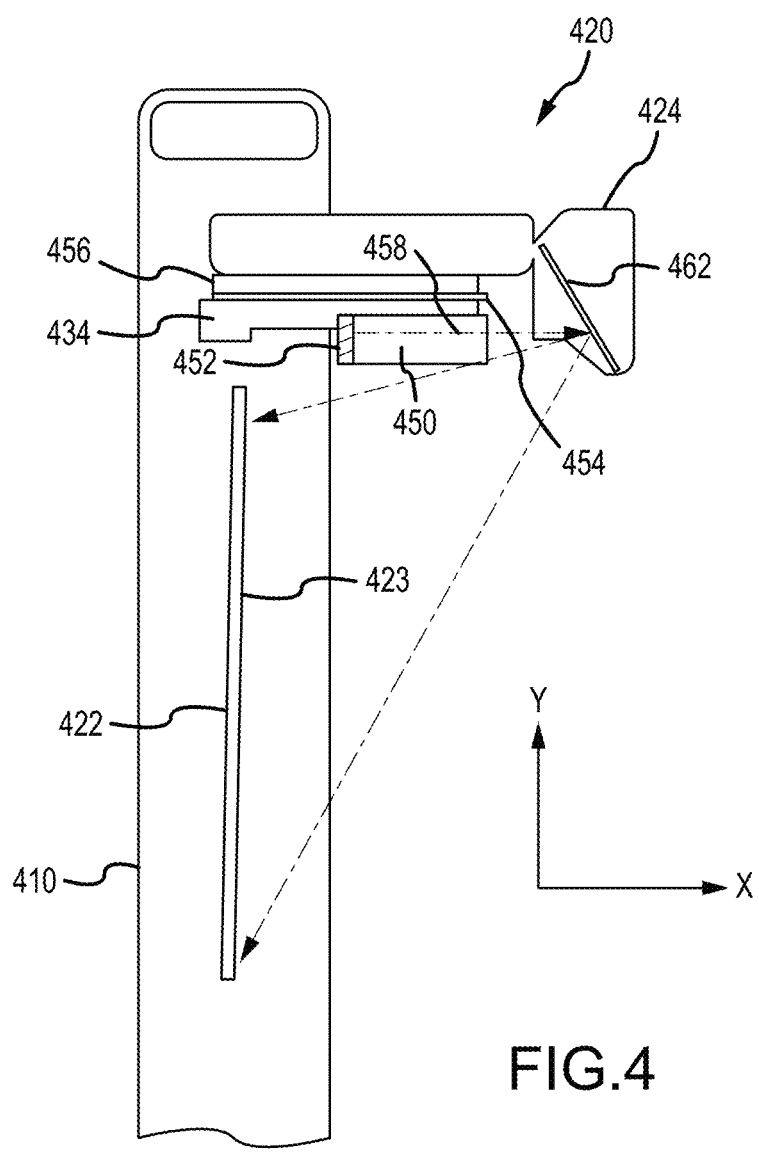
FIG. 4 illustrates a side view of an in-flight entertainment system, in accordance with various embodiments.

Referring now to FIG. 4, a schematic side view of an in-flight entertainment system 420 is provided, in accordance with various embodiments. The in-flight entertainment system 420 includes a display 422 and a projector 424. The projector 424 includes an optical engine 450 electrically coupled to an electronics package 434. In various embodiments, the optical engine 450 comprises an optical module containing a light source, such as, for example, a plurality of red, green and blue light emitting diodes 452 (or RGB LEDs). The electronics package 434 may include circuitry on a printed circuit board 454 that is thermally protected by a heat sink 456, which, in various embodiments, may be either a passive heat sink or a fan-driven heat sink. A light signal 458 from the light source—e.g., the plurality of red, green and blue light emitting diodes 452—is directed in a generally horizontal direction (e.g., in the positive x-direction) toward a mirror 462. The light signal 458 then interacts with the mirror 462 and is redirected in a direction having components in the negative y-direction and the negative x-direction and onto the display 422. In various embodiments, the mirror 462 is contoured or shaped to spread the light signal 458 over a viewing surface 423 of the display 422. In various embodiments, the projector 424 is attached to the display 422 and housed within a seatback 410 that houses the display 422 and extends in a generally horizontal direction (e.g., in the positive x-direction) from the seatback 410 such that the mirror 462 is disposed above and a distance in the x-direction away from the display 422 so as to redirect the light signal 458 onto the viewing surface 423.

Figure 5:
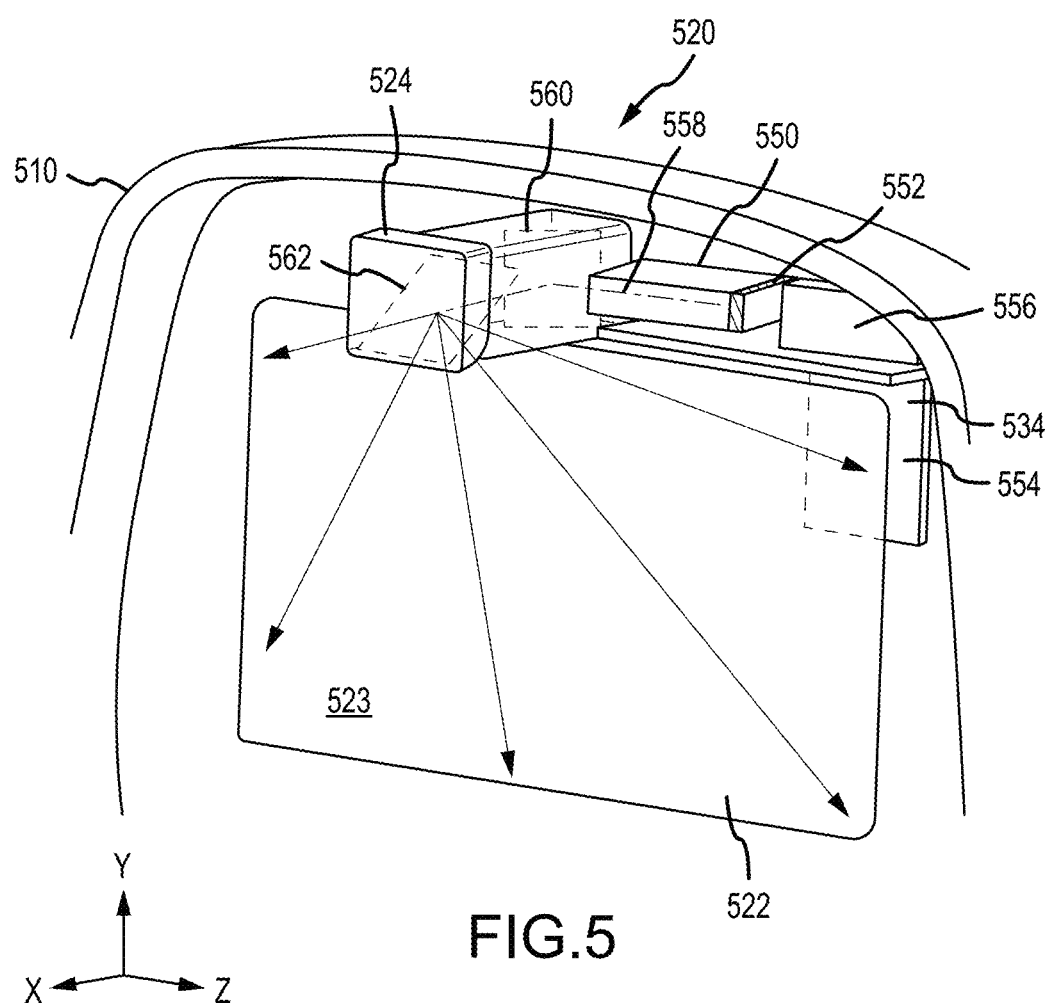
FIG. 5 illustrates a perspective view of an in-flight entertainment system, in accordance with various embodiments.

Referring now to FIG. 5, a schematic perspective view of an in-flight entertainment system 520 is provided, in accordance with various embodiments. The in-flight entertainment system 520 includes a display 522 and a projector 524. The projector 524 includes an optical engine 550 electrically coupled to an electronics package 534. In various embodiments, the optical engine 550 comprises an optical module containing a light source, such as, for example, a plurality of red, green and blue light emitting diodes 552 (or RGB LEDs). The electronics package 534 may include circuitry on a printed circuit board 554 that is thermally protected by a heat sink 556, which, in various embodiments, may be either a passive heat sink or a fan-driven heat sink. A light signal 558 from the light source—e.g., the plurality of red, green and blue light emitting diodes 552—is directed upward in a generally horizontal direction (e.g., a first direction or the negative z-direction) toward a first mirror 560. The light signal 558 interacts with the first mirror 560 and is redirected in a second direction generally aligned with the positive x-direction. The light signal 558 then interacts with a second mirror 562 and is redirected in a direction having components in the negative y-direction and the negative x-direction and onto the display 522. In various embodiments, the second mirror 562 is contoured or shaped to spread the light signal 558 over a viewing surface 523 of the display 522. In various embodiments, the projector 524 is attached to the display 522 and housed within a seatback 510 that houses the display 522 and extends in a generally horizontal direction (e.g., in the positive x-direction) from the seatback 510 such that the second mirror 562 is disposed above and a distance in the x-direction away from the display 522 so as to redirect the light signal 558 onto the viewing surface 523.

Figure 6:
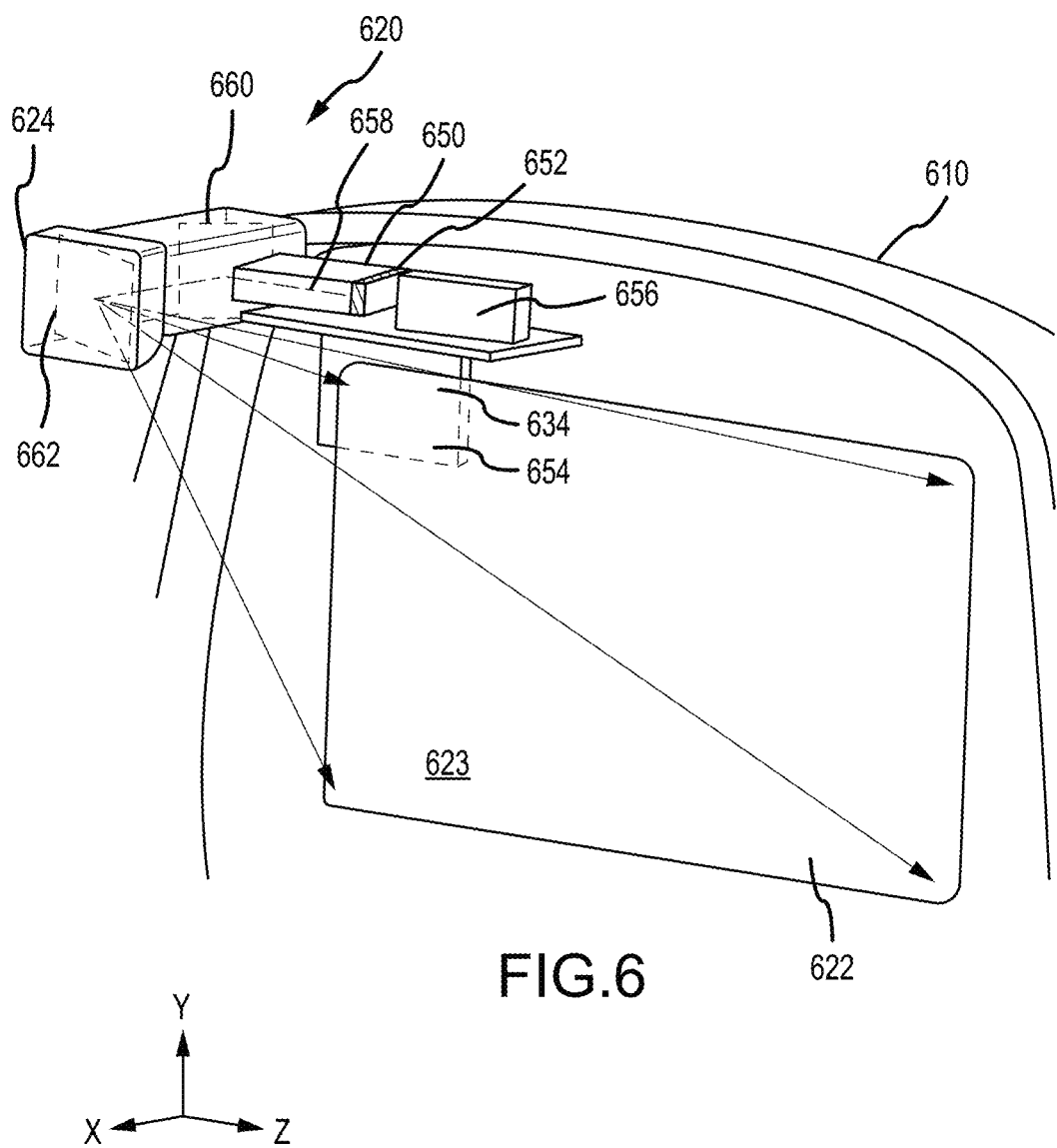
FIG. 6 illustrates a perspective view of an in-flight entertainment system, in accordance with various embodiments.

Referring now to FIG. 6, a schematic perspective view of an in-flight entertainment system 620 is provided, in accordance with various embodiments. The in-flight entertainment system 620 includes a display 622 and a projector 624. The projector 624 includes an optical engine 650 electrically coupled to an electronics package 634. In various embodiments, the optical engine 650 comprises an optical module containing a light source, such as, for example, a plurality of red, green and blue light emitting diodes 652 (or RGB LEDs). The electronics package 634 may include circuitry on a printed circuit board 654 that is thermally protected by a heat sink 656, which, in various embodiments, may be either a passive heat sink or a fan-driven heat sink. A light signal 658 from the light source—e.g., the plurality of red, green and blue light emitting diodes 652—is directed upward in a generally horizontal direction (e.g., a first direction or the negative z-direction) toward a first mirror 660. The light signal 658 interacts with the first mirror 660 and is redirected in a second direction generally aligned with the positive x-direction. The light signal 658 then interacts with a second mirror 662 and is redirected in a direction having components in the negative y-direction and the positive z-direction and onto the display 622. In various embodiments, the second mirror 662 is contoured or shaped to spread the light signal 658 over a viewing surface 623 of the display 622. In various embodiments, the projector 624 is attached to the display 622 and housed within a seatback 610 that houses the display 622 and extends in a generally horizontal direction (e.g., in the positive x-direction) from the seatback 610 such that the second mirror 662 is disposed above and a distance in the negative z-direction away from and to the side of the display 622 so as to redirect the light signal 658 onto the viewing surface 623.

Figure 7A:
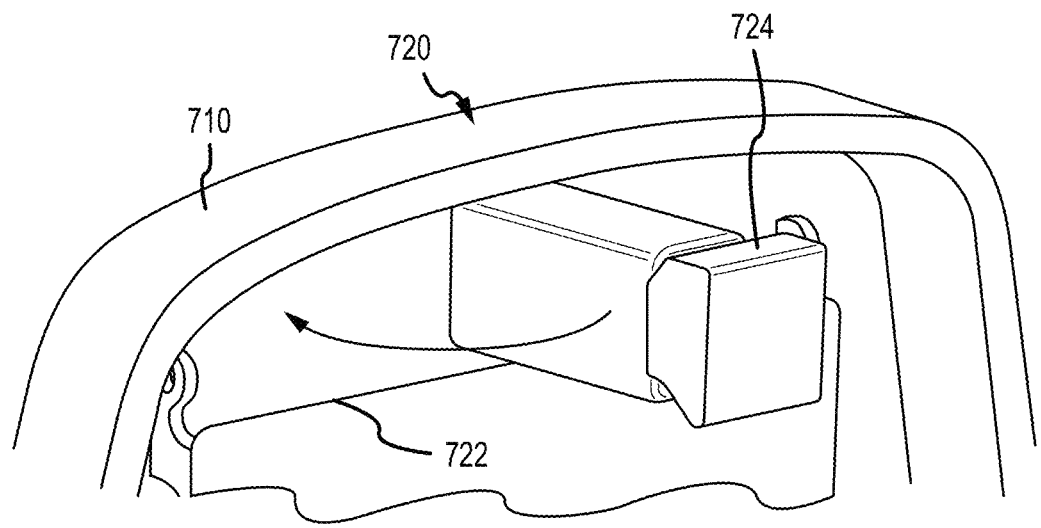
FIGS. 7A and 7B illustrate perspective views of an in-flight entertainment system, in accordance with various embodiments.
Figure 7B:
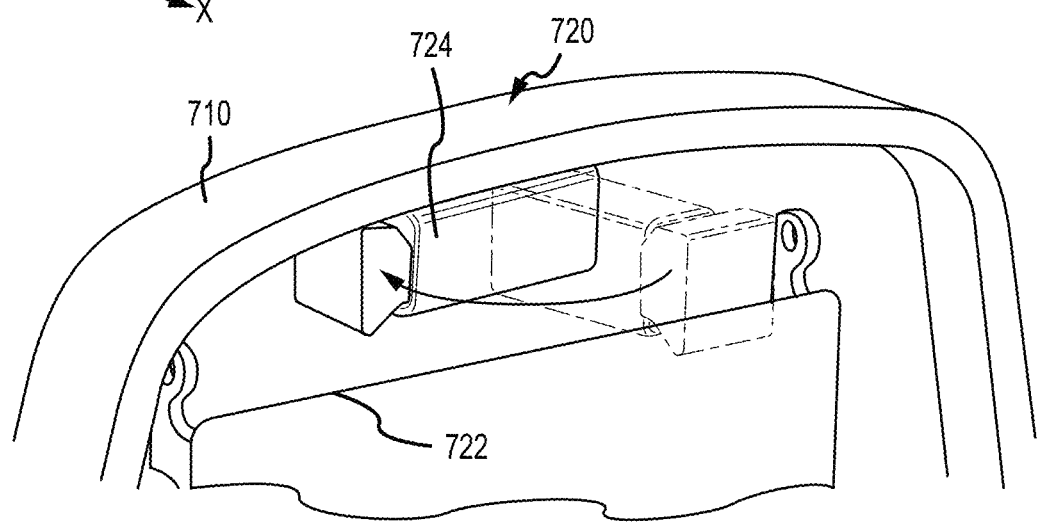

Referring now to FIGS. 7A and 7B, a schematic perspective view of an in-flight entertainment system 720 is provided, in accordance with various embodiments. The in-flight entertainment system 720 includes a display 722 and a projector 724. In various embodiments, the projector 724 is connected to a seatback 710 that houses the display 722 and extends in a generally horizontal direction (e.g., in the positive x-direction) from the seatback 710 when being operated, as illustrated in FIG. 7A. When not in operation—e.g., during takeoff or landing—the projector may be rotated into the body of the seatback 710 and stowed, as illustrated in FIG. 7B.

Figure 8A:
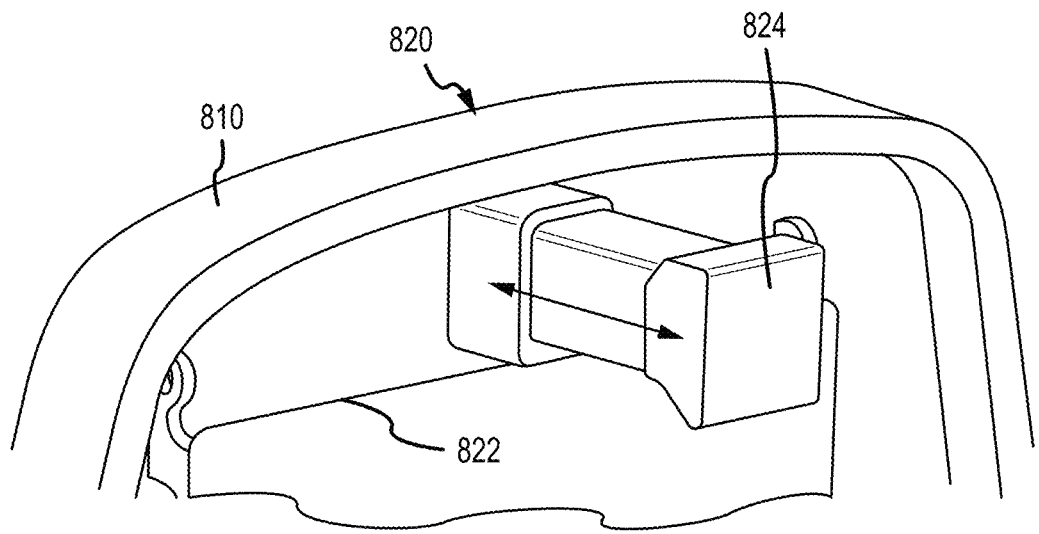
FIGS. 8A and 8B illustrate perspective views of an in-flight entertainment system, in accordance with various embodiments.
Figure 8B:
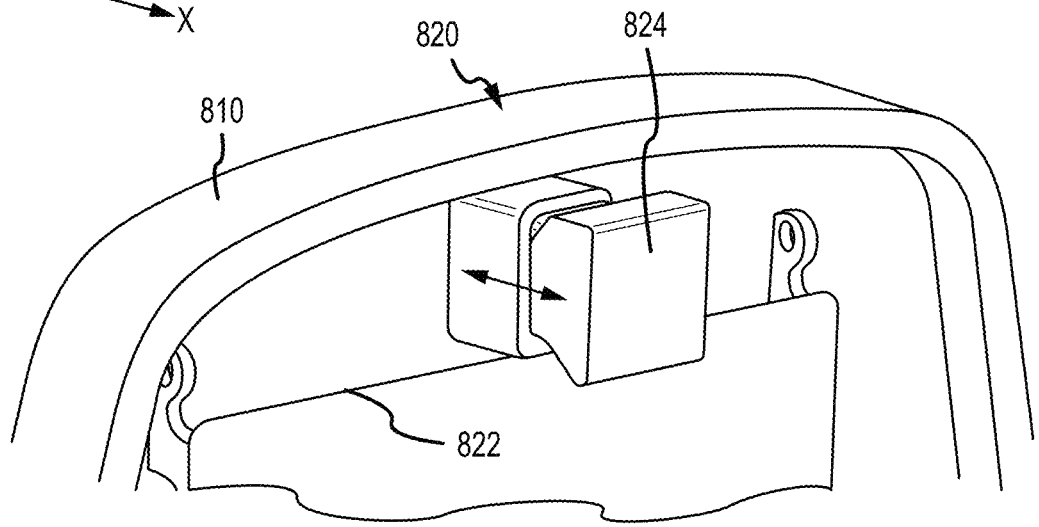

Referring now to FIGS. 8A and 8B, a schematic perspective view of an in-flight entertainment system 820 is provided, in accordance with various embodiments. The in-flight entertainment system 820 includes a display 822 and a projector 824. In various embodiments, the projector 824 is connected to a seatback 810 that houses the display 822 and extends in a generally horizontal direction (e.g., in the positive x-direction) from the seatback 810 when being operated, as illustrated in FIG. 8A. When not in operation—e.g., during takeoff or landing—the projector may be telescoped into the body of the seatback 810 and stowed, as illustrated in FIG. 8B.

Referring now to FIG. 9, a schematic frontal view of an in-flight entertainment system 920, similar to the various in-flight entertainment systems described above, is provided. In various embodiments, the in-flight entertainment system 920 includes a display 922 and a first projector $924_1$ and a second projector $924_2$ spaced a distance, laterally across the display 922, from the first projector $924_1$. In various embodiments, both the first projector $924_1$ and the second projector $924_2$ are ultra-short throw projectors that enable the in-flight entertainment system 920 to have an overall thickness on the order of less than one inch ($\approx$25.4 mm) for a display diagonal 929 on the order of thirteen inches ($\approx$330 mm). In various embodiments, an overall length of the first projector $924_1$ and the second projector $924_2$ in a direction parallel to a surface normal of the viewing surface is between about one inch ($\approx$25.4 mm) and about four inches ($\approx$100 mm). The reduction in overall thickness—e.g., when compared to the overall thickness 228 of the in-flight entertainment system 220 described above with reference to FIGS. 2A-2D—is achieved by reducing the area of the display 922 each of the projectors is required to illuminate. For example, as illustrated in FIG. 9, the first projector $924_1$ is required to illuminate only a first half 921 of the display 922, while the second projector $924_2$ is configured to illuminate only a second half 923 of the display 922. The reduction in surface area required by each projector to illuminate enables a more compact light path for the projector and, hence, a reduction in the overall length of each projector. Embodiments having any number of projectors positioned at various locations about a periphery 925 of the display 922 are contemplated, including, for example, one or more projectors positioned on a first side 927 of the display 922 (e.g., a third projector $924_3$), one or more projectors positioned on a second side 951 of the display 422 (e.g., a fourth projector $924_4$) or one or more projectors positioned on a lower side 931 of the display 922.

Figure 10:
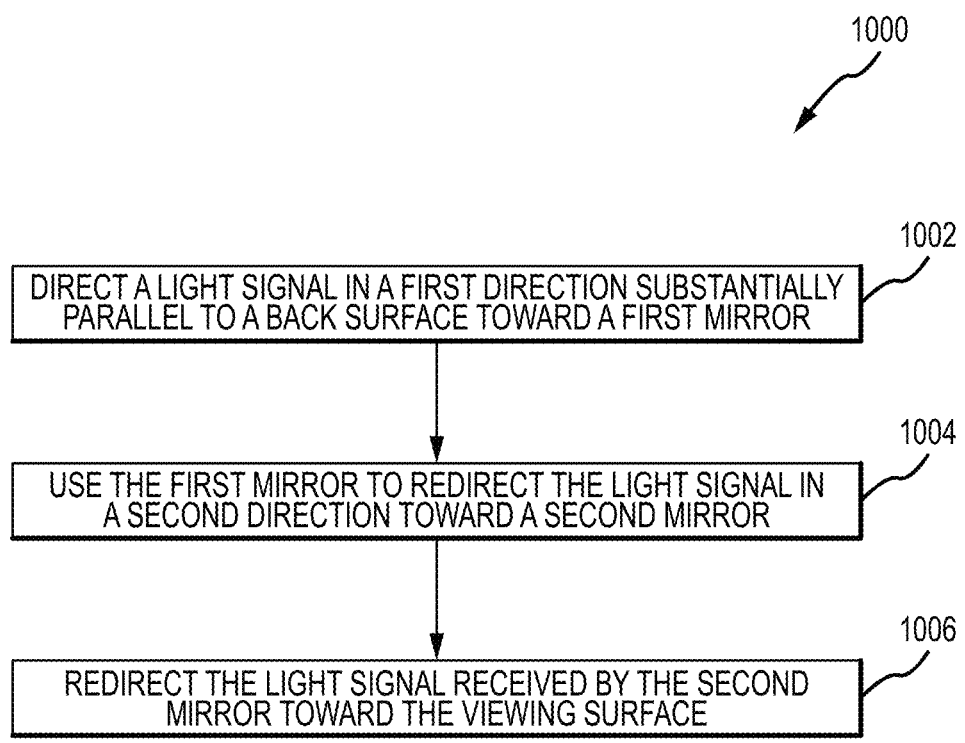
FIG. 10 described various method steps involved in illuminating a display having a viewing surface and a back surface opposite the viewing surface, in accordance with various embodiments.

Referring now to FIG. 10, a method 1000 of illuminating a display having a viewing surface and a back surface opposite the viewing surface is described as comprising at least the following steps. A first step 1002 includes directing a light signal in a first direction substantially parallel to the back surface toward a first mirror. A second step 1004 includes redirecting the light signal in a second direction toward a second mirror. A third step 1006 includes redirecting the light signal received by the second mirror toward the viewing surface. In various embodiments, the light signal is generated by a light source connected to the back surface of the display and oriented to direct the light signal in the first direction.

The above disclosure provides an in-flight entertainment system having a reduced screen thickness that leads to additional living space for a passenger seated in his or her seat and the seatback directly in front, a reduced weight of the seat and improved head injury characteristics of the seating arrangement. The design of the projector enables placement at any location about the perimeter of the display screen and, in various embodiments, at several locations, which also enables a more compact system. The display screen also permits touch control functionality, using, for example, resistive, capacitive or depth or proximity sensing technologies. In various embodiments, servo motors may be incorporated into the lens and mirror systems described above for fine adjustment or focusing of the picture illuminated on the display screen.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An in-flight entertainment system, comprising:
   a display having a viewing surface and a back surface opposite the viewing surface; and
   a projector including a first mirror and a second mirror, the projector connected to the back surface of the display and configured to illuminate the viewing surface via the first mirror and the second mirror, wherein the first mirror is oriented to redirect a light signal from a light source from a first direction to a second direction incident from the first direction, wherein the second mirror is oriented to redirect the light signal from the second direction to a third direction opposite the first direction and onto the viewing surface.

2. The in-flight entertainment system of claim 1, wherein the projector includes the light source configured to direct the light signal in the first direction parallel to a portion of the back surface.

3. The in-flight entertainment system of claim 2, further comprising an electronics package configured to power the light source, the electronics package mounted on the back surface of the display.

4. The in-flight entertainment system of claim 3, wherein the electronics package includes a printed circuit board and a heat sink configured to cool the light source.

5. The in-flight entertainment system of claim 1, wherein the projector includes a first portion connected to the back surface of the display and a second portion directed toward the viewing surface.

6. The in-flight entertainment system of claim 5, wherein the first portion of the projector includes the first mirror oriented to redirect the light signal in the first direction, the first direction being parallel to a portion of the back surface.

7. The in-flight entertainment system of claim 6, wherein the second mirror is disposed within the second portion of the projector.

8. The in-flight entertainment system of claim 7, wherein an overall length of the projector in a direction parallel to a surface normal of the viewing surface is between one inch and four inches.

9. An aircraft passenger seating arrangement, comprising:
   a first seat having a seatback; and
   an in-flight entertainment system disposed within the seatback, the in-flight entertainment system including:

a display having a viewing surface and a back surface opposite the viewing surface, and a projector connected to the display and configured to illuminate the viewing surface, the projector including:

a light source configured to direct a light signal in a first direction;

a first mirror oriented to redirect the light signal to a second direction incident the first direction; and a second mirror oriented to redirect the light signal to a third direction opposite the first direction.

10. The aircraft passenger seating arrangement of claim 9, wherein the projector is connected to the back surface, wherein the first direction is parallel to a portion of the back surface.

11. The aircraft passenger seating arrangement of claim 10, wherein the second direction is parallel to a surface normal defined by the viewing surface.

12. The aircraft passenger seating arrangement of claim 11, wherein the second mirror redirects the light signal onto the viewing surface.

13. The aircraft passenger seating arrangement of claim 12, further comprising an electronics package configured to power the light source, the electronics package disposed within the seatback and mounted on the back surface of the display.

14. The aircraft passenger seating arrangement of claim 13, wherein the electronics package includes a printed circuit board and a heat sink configured to cool the light source.

15. The aircraft passenger seating arrangement of claim 14, wherein the projector includes a first portion connected to the back surface of the display and a second portion directed toward the viewing surface.

16. The aircraft passenger seating arrangement of claim 15, wherein the first portion of the projector includes the first mirror oriented to redirect the light signal and the second mirror is disposed within the second portion of the projector and oriented to redirect the light signal toward the viewing surface.

17. The aircraft passenger seat arrangement of claim 9, wherein the projector is configured to extend horizontal from the seatback.

18. A method of illuminating a display having a viewing surface and a back surface opposite the viewing surface, comprising:

directing a light signal in a first direction parallel to the back surface toward a first mirror;

redirecting the light signal toward a second mirror in a second direction incident the first direction; and redirecting the light signal received by the second mirror in a third direction toward the viewing surface, the third direction being opposite the first direction.

19. The method of claim 18, wherein the light signal is generated by a light source connected to the back surface of the display and oriented to direct the light signal in the first direction.

* * * * *